Figure 4:

(No Model.) 2 Sheets—Sheet 1.
H. WOODWARD.
METHOD OF PRODUCING ELECTRODES FOR SECONDARY BATTERIES.
No. 393,954. Patented Dec. 4, 1888.
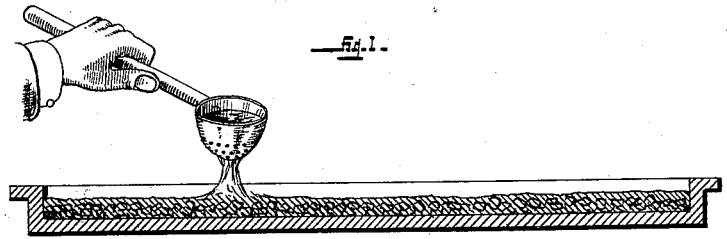
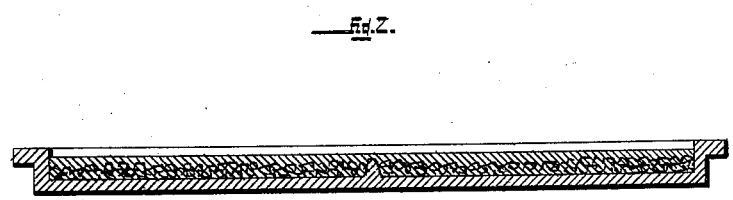
Witnesses:
W. W. Mortimer
R. W. Elliott
Inventor:
Henry Woodward,
by R. S. Dyrenforth,
his Attorney.

(No Model.) 2 Sheets—Sheet 2.

H. WOODWARD.
METHOD OF PRODUCING ELECTRODES FOR SECONDARY BATTERIES.

No. 393,954. Patented Dec. 4, 1888.

Witnesses:

Inventor:
Henry Woodward,
by R. S. Dyrenforth,
his Attorney.

UNITED STATES PATENT OFFICE.

HENRY WOODWARD, OF SHEPHERD'S BUSH, COUNTY OF MIDDLESEX, ENGLAND, ASSIGNOR TO THE WOODWARD ELECTRICAL COMPANY, OF DETROIT, MICHIGAN.

METHOD OF PRODUCING ELECTRODES FOR SECONDARY BATTERIES.

SPECIFICATION forming part of Letters Patent No. 393,954, dated December 4, 1888.

Application filed March 9, 1888. Serial No. 266,681. (No model.)

*To all whom it may concern:*

Be it known that I, HENRY WOODWARD, a subject of the Queen of England, residing at Shepherd's Bush, in the county of Middlesex, England, have invented certain new and useful Improvements in Methods of Producing Electrodes for Secondary Electric Batteries; and I do hereby declare the following to be a full, clear, and exact description of the invention, such as will enable others skilled in the art to which it appertains to make and use the same.

This invention relates to the manufacture of electrodes for secondary electric batteries.

The object is to produce an electrode for a secondary electric battery which shall present great surface exposure; which, by the peculiar structure of its surface, shall present the best means for retaining active material either integral with it or upon it, placed without liability of scaling or falling off, and which shall be of the highest efficiency in use, and this in a ready, practical, and comparatively inexpensive manner.

With these objects in view the invention consists in producing a support, subsequently to form an electrode for a secondary electric battery, by casting or molding a suitable metallic or plastic substance against a body or mass of such form that the metal in casting, or the plastic substance on pressure, will penetrate the body or mass from which it is subsequently to be freed and left in a cellular condition on the surface.

Furthermore, the invention consists in producing a support for an electrode for a secondary electric battery by casting or molding a suitable metallic or plastic substance against a body or mass of such form that the metal in casting, or the plastic substance on pressure, will enter the body, while a portion is left above or upon it, whereby, upon removing the body into which the molten or plastic substance has penetrated, this will be left at one surface in a cellular or porous condition, while the other will be comparatively even, and then bending or breaking the product and placing the smooth portions, together with the rough surface, outward.

The invention consists, more particularly, in producing a support for an electrode for a secondary electric battery by casting a suitable metal against soluble matter of such a nature that the metal while in a molten condition will penetrate the soluble matter, and then dissolving off or out the soluble matter, leaving the metal at the surface which was in contact with the soluble matter in a highly porous or cellular condition.

The invention consists still more particularly in producing a support for an electrode for a secondary electric battery by casting a suitable metal—such as lead—upon a bed of broken rock-salt, allowing a portion of the metal to flow between the portions of the rock-salt, leaving part of the metal above the bed to form a backing, whereby, upon the cooling of the metal and upon the dissolving out of the salt, a cast body will be presented suitable for a support for an electrode, having an irregularly-cellular or highly-porous surface, presenting the utmost exposure and great retaining capabilities for any substance to it applied and a smooth surface in the nature of a backing.

The invention consists still more particularly in producing a support for an electrode for a secondary electric battery by casting a suitable metal or pressing a suitable plastic substance upon a bed of suitable matter, into which it can penetrate, and forming a depression transversely of the cast or pressed body, whereby the body, after forming, may be readily bent or broken transversely.

Furthermore, the invention consists in producing a support for an electrode for a secondary electric battery by casting a suitable metal—such as lead—upon a body of rock-salt contained in a mold having a transverse and substantially-central ridge in such manner that the metal will in part penetrate the rock-salt and in part remain above it, leaving a mass with a rough and transversely-divided surface below and a comparatively smooth and even surface above; then, upon cooling, dissolving out the rock-salt; then bending the mass in such manner that the smooth surfaces will come together, or back to back, and then fastening the parts together by rivets or in any other suitable manner.

The invention consists, finally, in producing the particular electrode formed.

In the accompanying drawings, forming part of this specification, I have illustrated (though of course the same may be somewhat varied without departing from the spirit of my invention) successive constructions of my support for an electrode, an unlicensed employment of any of which, either alone or in conjunction with other matter, would be an infringement of my rights and those of my assignee, THE WOODWARD ELECTRICAL COMPANY.

Figure 5:
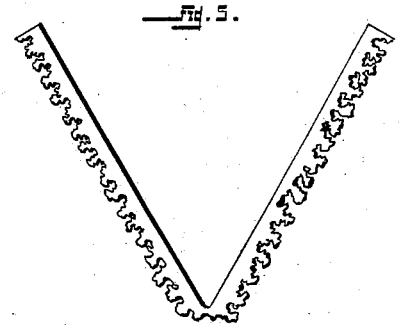
Figure 6:
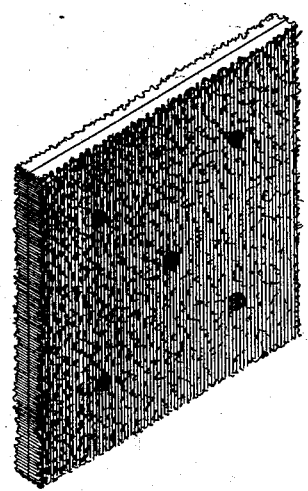

In the drawings, Figure 1 is a longitudinal sectional view showing the support under process of forming, in this instance by casting and upon rock-salt, the flow of metal taking place, by preference, from a perforated ladle. Fig. 2 is a longitudinal sectional view of the metallic or plastic substance upon its layer of penetrable matter in the mold, and showing the mold with a transverse central ridge. Fig. 3 is a longitudinal sectional view of a portion of the metallic or plastic substance out of the mold, showing the penetrable substance—such as rock-salt in crystals—adhering to its under surface. Fig. 4 is a longitudinal sectional view of the metallic or plastic substance after removal of the penetrable matter—such as rock-salt—removed by solution, showing the one surface of the substance roughened, cellular, or highly porous, and the other comparatively smooth, and showing, also, a transverse cut or line of demarkation or division. Fig. 5 is a view showing the manner of bending a support to bring the backs together when it has been made with a transverse cut. Fig. 6 is a view showing a method of fastening together two parts of a support by inserting rivets.

As an illustration of one means of carrying the invention into effect, a suitable mold is partly filled with a quantity of any suitable substance into which molten metal or plastic material will penetrate and which can afterward be readily removed. It is preferred to employ a soluble substance, and of soluble substances the preference is given to broken rock-salt. The rock-salt is filled into the mold to any depth sufficient to leave a suitable thickness for a solid plate above. Upon the crystals of rock-salt molten metal—such as lead—is poured, preferably from a perforated ladle, delivering the metal into the mold in small streams. The molten metal then enters the interstices between the pieces or crystals of salt, and, besides overflowing the salt and running against the sides of the mold, forms a continuous sheet above. After cooling, the metallic substance is taken from the mold and the salt is dissolved out, whereupon the substance will be presented with one surface in a rough, cellular, or highly-porous condition, and with the other comparatively smooth, presenting, where the mold is of the shape here chosen to illustrate the invention, a solid metallic plate, protruding from one side of which is the cellular mass referred to, and it will be seen that owing to the varied forms of the pieces or crystals of rock-salt or of the different directions of the interstices of the matter into which the molten metal or other metallic body has penetrated the cells formed by the penetrated matter will form a net-work of cavities particularly adapted firmly to retain any plastic mass applied to the body or inserted into the cells. It will be obvious, however, that the resulting support or electrode may be round with a rough surface and central solid body or of any other desired form, according to the shape of the mold and the disposition of the penetrable matter. The roughened and cellular surface may itself present an electrode, or will form an admirable support for an active material—such as lead oxide—which, when applied in a plastic condition by smearing on and pressure, will be caused to take the form of the various cells, and, the outer surface also presenting retaining points, it will there be firmly held when the whole is in use as an electrode, thus obviating the great objection of the scaling off or falling of the active material from its support, which is the common fault of electrodes as now made for use in secondary batteries. By the peculiar formation of the roughened surface, also, the utmost surface exposure is presented. After the support has been molded it is preferable to bend or break it in two with the solid portion within and the rough portion without, and the two parts are then fastened together, as by punching holes through them at one or more points and supplying them with leaden rivets, the whole then presenting a suitable support or electrode. As required, these supports are provided with active material, as by smearing such upon them in a plastic state and pressing it into the cells, and a proper electrode is then produced by forming in the usual manner; or, if the cellular substance be of proper nature for the purpose, it may be formed direct.

The support produced by the herein-described method is not claimed, the same forming the subject-matter of an application filed of even date herewith, Serial No. 266,682.

Having thus fully described my invention, what I claim as new, and desire to secure by Letters Patent, is—

1. The method of producing a support for an electrode for a secondary electric battery by casting or molding a suitable metallic or plastic substance against a penetrable body or mass, leaving a portion of the metallic or plastic substance above or upon it, whereby upon removing the body or mass into which the molten or plastic substance has penetrated this will be left at one surface in a cellular or porous condition, while the other will be comparatively even, substantially as described.

2. The method of producing a support for an electrode for a secondary battery by casting or molding a suitable metallic or plastic substance against a body or mass of such form or nature that the metal in casting or the plastic substance on pressure will enter the body, while a portion is left above or upon it, whereby upon removing the body into which the molten or plastic mass has penetrated this will be left at one surface in a cellular or porous condition, while the other will be comparatively even, and then bending or breaking the product and placing the smooth portions together with the rough surface outward, substantially as set forth.

3. The method of producing a support for an electrode for a secondary battery by casting a suitable metal or pressing a suitable plastic material upon a bed of suitable substance into which it can penetrate and forming a depression transversely of the cast or pressed body, substantially as and for the purpose set forth.

4. The method of producing a support for an electrode by casting a metal, such as lead, upon a body of rock-salt contained in a mold having a transverse and substantially-central ridge, removing the body after cooling, dissolving out the rock-salt, and placing the parts on each side of the depression, together with the smooth portions, inward, substantially as described.

In testimony whereof I affix my signature in presence of two witnesses.

HENRY WOODWARD.

Witnesses:
  WM. FITZSIMONS,
  J. B. EMMONS,
    *Both of U. S. Consulate, Liverpool.*